US010909767B1

(12) United States Patent
Childress et al.

(10) Patent No.: US 10,909,767 B1
(45) Date of Patent: Feb. 2, 2021

(54) FOCAL AND INTERACTION DRIVEN CONTENT REPLACEMENT INTO AUGMENTED REALITY

(71) Applicant: International Business Machines Corporation, Armonk, NY (US)

(72) Inventors: Rhonda L. Childress, Austin, TX (US); Zachary A. Silverstein, Austin, TX (US); Michael Bender, Rye Brook, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/528,979

(22) Filed: Aug. 1, 2019

(51) Int. Cl.
*G06F 3/01* (2006.01)
*G06T 19/00* (2011.01)

(52) U.S. Cl.
CPC ............ *G06T 19/006* (2013.01); *G06F 3/013* (2013.01)

(58) Field of Classification Search
CPC .............................................. G06F 3/011–015
See application file for complete search history.

(56) References Cited

U.S. PATENT DOCUMENTS

| 8,316,450 | B2 | 11/2012 | Robinson et al. | |
| 8,471,843 | B2 | 6/2013 | Finn et al. | |
| 8,644,842 | B2 | 2/2014 | Arrasvuori et al. | |
| 8,814,691 | B2 | 8/2014 | Haddick et al. | |
| 2008/0071559 | A1* | 3/2008 | Arrasvuori | G06T 19/006 705/26.1 |
| 2008/0208674 | A1 | 8/2008 | Hamilton et al. | |
| 2013/0147837 | A1 | 6/2013 | Stroila | |
| 2014/0171039 | A1 | 6/2014 | Bjontegard | |
| 2014/0225978 | A1 | 8/2014 | Saban et al. | |
| 2014/0361988 | A1* | 12/2014 | Katz | G06F 3/012 345/156 |
| 2015/0260474 | A1 | 9/2015 | Rublowsky et al. | |
| 2019/0114061 | A1* | 4/2019 | Daniels | G06F 15/16 |
| 2019/0324548 | A1* | 10/2019 | Garcia | G06F 3/013 |

OTHER PUBLICATIONS

Forecast augmented (AR) and virtual reality (VR) market size worldwide from 2016-2023 (in billion U.S. dollars), Statista, Printed Jun. 13, 2019, One page, <https://www/statista.com/statists/591181/global-augmented-virtual-reality-market-size>.
Chakravarthula et al., "FocusAR: Auto-focus Augmented Reality Eyeglasses for both Real World and Virtual Imagery", IEEE Transactions on Visualization and Computer Graphics, vol. 24, No. 11, Nov. 2018, pp. 2906-2916.
Lepouras et al., "Adaptive Virtual Reality Museums on the Web." In book: Adaptable and Adaptive Hypermedia Systems. Edited by S. Chen and G. Magoulas. (IRM Press. Aug. 2005).

(Continued)

*Primary Examiner* — Roy P Rabindranath
(74) *Attorney, Agent, or Firm* — Sonny Z. Zhan

(57) ABSTRACT

In an approach for augmented reality, a processor captures an object, via a sensor, that has captured an attention of a user. A processor injects the object in a virtualized view into an augmented reality simulation. A processor modifies the augmented reality simulation around the object in the virtualized view in a non-intrusive way.

14 Claims, 6 Drawing Sheets

(56) References Cited

OTHER PUBLICATIONS

Mitra, Ambarish, "Augmented Reality's Next Frontier Is Real-World Search", Wired Magazine, Jun. 17, 2014, 8 pages, <http://www/wired.com/2014/06/well-soon-be-researching-3-d-objects-just-by-looking-at-them>.
Tulchinsky et al., "Real-World Products in Virtual Environments." An IP.com Prior Art Database Technical Disclosure, IP.com No. IPCOM000229273D, Publication Date: Jul. 17, 2013, 18 pages.
Mell et al., "The NIST Definition of Cloud Computing", Recommendations of the National Institute of Standards and Technology, Special Publication 800-145, Sep. 2011, 7 pages.

\* cited by examiner

FOCAL AND INTERACTION DRIVEN CONTENT REPLACEMENT INTO AUGMENTED REALITY

BACKGROUND

The present disclosure relates generally to the field of augmented reality, and more particularly to content replacement into augmented reality.

With the help of advanced augmented reality technology (e.g., adding computer vision and object recognition), information about a surrounding real world of a user becomes interactive and digitally manipulatable. Information about an environment and its objects is overlaid on the real world. This information can be virtual or real, e.g., seeing other real sensed or measured information such as electromagnetic radio waves overlaid in exact alignment with where they are in space.

SUMMARY

Aspects of an embodiment of the present disclosure disclose an approach for augmented reality. A processor captures an object, via a sensor, that has captured an attention of a user. A processor injects the object in a virtualized view into an augmented reality simulation. A processor modifies the augmented reality simulation around the object in the virtualized view in a non-intrusive way.

DETAILED DESCRIPTION

Figure 1:
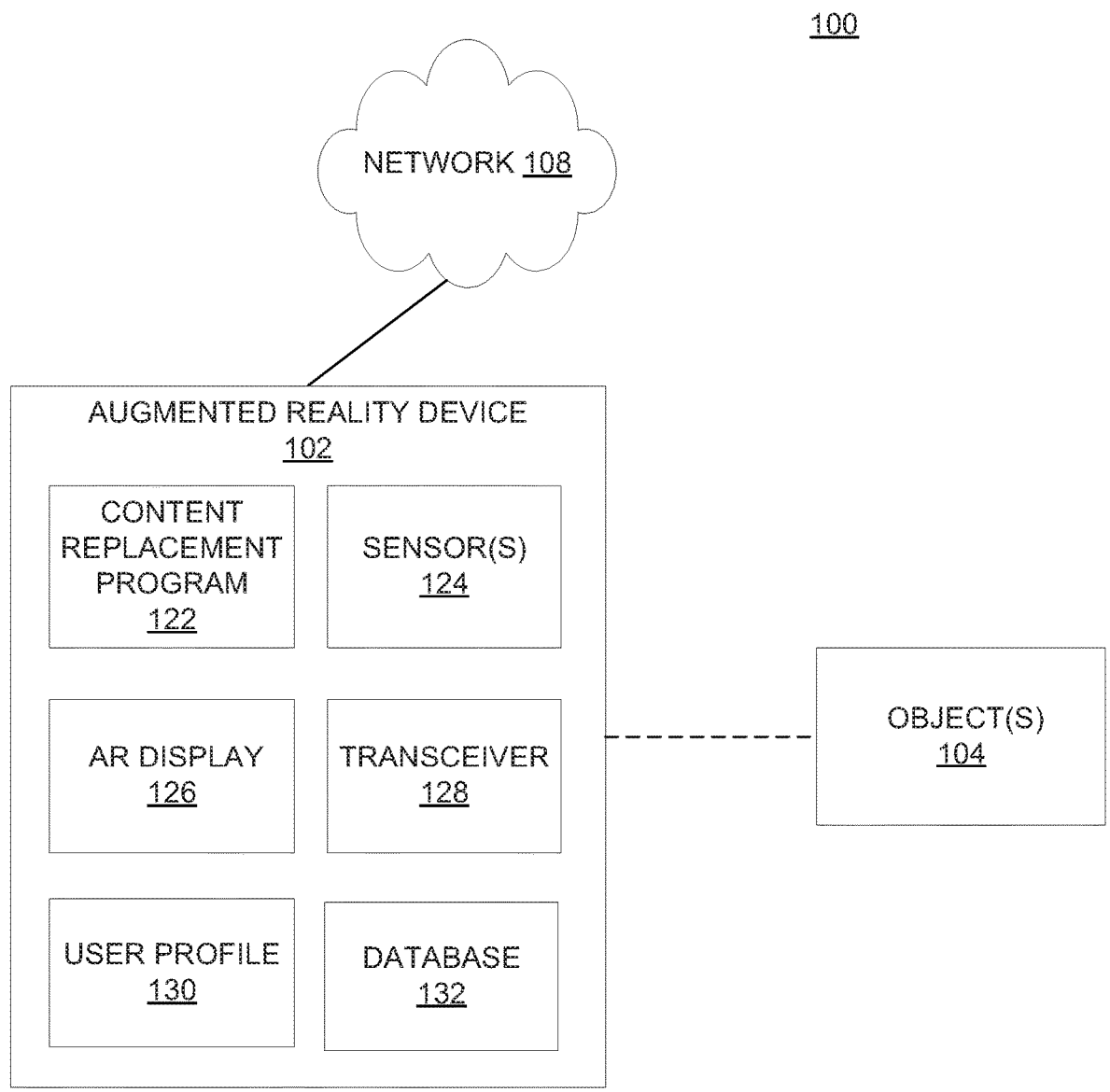
FIG. 1 is a functional block diagram illustrating an augmented reality environment, in accordance with an embodiment of the present disclosure.

The present disclosure is directed to systems and methods for capturing a user focal point via an augmented reality device and replacing a generic object with a specific object in a virtualized view based on an augmented reality context.

Virtual reality (VR) is the term used to describe a three-dimensional, computer generated environment which can be explored and interacted with by a person. Virtual reality is an experience taking place within simulated and immersive environments that can be similar to or completely different from the real world. Applications of virtual reality can include entertainment (e.g., gaming) and educational purposes (e.g., medical training). Virtual reality may include augmented reality.

Augmented reality (AR) may be a live direct or indirect view of a physical, real-world environment whose elements are augmented (or supplemented) by computer-generated sensory input such as sound, video, graphics or global positioning system data. Augmented reality may be performed in real time and in context with environmental elements.

The present disclosure discloses that displaying specific information relevant to users within an augmented reality environment increases engagement of the users. With the invention and proliferation of augmented reality devices, a user is introduced to and given access to a significant amount of information. The information includes contextual surrounding information, including what a user is interacting with and viewing. Upon further analysis of the information, a user can have a better understanding about what items capture the interest of the user and can utilize the information to create a more enjoyable and engaging interaction in a variety of augmented reality scenarios.

The present disclosure presents a solution to capture and identify a user's focus through an augmented reality viewport in a real world and to introduce or embed the focused content (e.g., elements of interest) into subsequent augmented reality interactions experienced by the user. The types of the augmented reality interactions and content replacements can be presented to a user in multiple options, including content replacements in a virtualized view.

In one example, content replacements can be a use case where a generic item is changed to a user's known level for replacement and greater synchronicity with the user. For instance, if a user is using an augmented reality device for simulation for interior design, then the augmented reality device may inject a recent item of furniture that has been catching the attention of the user. In another example, an augmented reality device may capture the user's focus on content while the user is at a grocery store. The user focuses their eyes on apples, but the user doesn't purchase any apples. When the user decides to play an augmented reality game about juggling utilizing the augmented reality device, the augmented reality device may prompt the user with a message about fruit (pulled from the user's derived focus body), because fruit was a recent item of interest to the user, more specifically apples. The game or augmented reality simulation may replace juggling balls with apples and begin the gameplay. The gameplay is measured and dynamically modified to attempt to ensure the user has a higher chance of a positive experience, so the user can associate that experience with apples and, in the future, possibly purchase apples.

In another example, content replacements can be a use case where a generic item is replaced with a specific item that a marketer utilizes to target a user to increase brand familiarity and associate with positive satisfaction. Content replacements can come from modifying the game/simulation visually, but also for a different type of association based on context and situation of users in the simulation or game. These content replacements are intended to not draw attention to themselves and apply more at a less-noticeable level or subliminal level.

The present disclosure will now be described in detail with reference to the Figures. FIG. 1 is a functional block diagram illustrating an augmented reality environment, generally designated 100, in accordance with an embodiment of the present disclosure.

In the depicted embodiment, augmented reality environment 100 includes augmented reality device 102, objects 104, and network 108.

In various embodiments of the present disclosure, augmented reality device 102 can be a laptop computer, a tablet computer, a netbook computer, a personal computer (PC), a desktop computer, a mobile phone, a smartphone, a smart watch, a wearable computing device, a personal digital assistant (PDA), or a server. In some embodiments, augmented reality device 102 can be an augmented reality headset, a virtual reality headset, a wearable device, a computer system such as the one shown in FIG. 4, or any other suitable electronic device. In another embodiment, augmented reality device 102 represents a computing system utilizing clustered computers and components to act as a single pool of seamless resources. In other embodiments, augmented reality device 102 may represent a server computing system utilizing multiple computers as a server system, such as in a cloud computing environment. In general, augmented reality device 102 can be any computing device or a combination of devices with access to content replacement program 122 and network 108 and is capable of processing program instructions and executing content replacement program 122, in accordance with an embodiment of the present disclosure. Augmented reality device 102 may include internal and external hardware components, as depicted and described in further detail with respect to FIG. 4.

Further, in the depicted embodiment, augmented reality device 102 includes content replacement program 122, sensor(s) 124, augmented reality (AR) display 126, transceiver 128, user profile 130, and database 132. In the depicted embodiment, content replacement program 122 is located on augmented reality device 102. However, in other embodiments, content replacement program 122 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between augmented reality device 102 and content replacement program 122, in accordance with a desired embodiment of the disclosure.

Content replacement program 122 is configured to capture objects 104, via sensor(s) 124, that have captured a user's attention. In an example, sensor(s) 124 can be one or more of image capture devices (e.g., digital cameras) for obtaining images and/or videos, microphones for obtaining audio recordings, and location sensors for obtaining location data of the user device (e.g., GPS coordinates). In other examples, sensor(s) 124 can be any sensor that is able to capture data and information of objects 104. In the depicted embodiment, sensor(s) 124 are located on augmented reality device 102. However, in other embodiments, sensor(s) 124 may be located externally and accessed through a communication network such as network 108.

In an example, a user can place augmented reality device 102 over the user's eyes and activate passive capture. Sensor(s) 124 capture the user's eye focus via eye tracking. In an example, sensor(s) 124 can be cameras or some other optical sensors that capture light reflected from the eyes of the user and measure eye motion. Eye tracking is the measurement of eye activity. For example, eye tracking may measure the point of gaze (where one is looking) and the motion of an eye relative to the head. Accordingly, sensor(s) 124 can locate the focal point of the user. Sensor(s) 124 capture objects 104 and communicate data associated with objects 104 to content replacement program 122. Objects 104 on the focal point of the user can be recognized and identified, for example, by image recognition, product association with Internet of Things (IoT) connections, barcode capture, or other suitable objection recognition technology. In an example, objects 104 may be physical objects that each include an object identification tag that is detectable by augmented reality device 102. In another example, objects 104 on the focal point of the user can be recognized and identified by audio, such as a bird call, voice, and song, which may identify a possible item of interest.

Content replacement program 122 may identify objects 104 by interpreting and processing data based on a focal point of a user that reflects the user's attention and interest on objects 104. In an example, determining object of interest is based on the user's gaze focus—what a user focuses on. Determining object of interest can be based on how much time a user looks at an object. For example, if a user glances at an object for over a certain period time, content replacement program 122 may recognize the interest of the user on the object. In another example, content replacement program 122 may recognize the interest of the user on an object based on multiple glances to the same object. In another example, content replacement program 122 may recognize the interest of the user on an object based on augmented reality device 102 detecting a speech of the user on the object. In another example, a user may opt-in to a specific replacement such as a grocery store to freely replace artifacts in augmented reality device 102. With this opt-in a user can highlight specific replacement objects and items.

Content replacement program 122 is configured to inject objects 104 into an augmented reality simulation that reflect the user's interest. In an example, the augmented reality simulation is a virtual reality simulation. Virtual reality is the term used to describe a three-dimensional, computer generated environment which can be explored and interacted with by a person. Virtual reality is an experience taking place within simulated and immersive environments that can be similar to or completely different from the real world. Applications of virtual reality can include entertainment (e.g., gaming) and educational purposes (e.g., medical training). In another example, the augmented reality or virtual reality simulation is a virtual reality video game.

Content replacement program 122 is configured to modify the augmented reality simulation to create a positive experience around the injected object. Content replacement program 122 may change the augmented reality simulation difficulty when objects 104 are injected. In some examples, content replacement program 122 may capture and associate a context in an augmented reality simulation to objects 104 that attracts the user's attention and interest. In augmented reality environment 100, for example, when the user plays a video game, in-game context is captured and matched with user interaction context of focused item. In some example, content replacement program 122 can determine via semantic ontology of items of interest or associated tags in the augmented reality simulation. In an example, a user can specify items of interest in user profile 130. In another example, content replacement program 122 can associate a context based on a generic tag association to objects 104. Content replacement program 122 may pull semantic tags from the generic tag association related to objects 104 and determine a list of prioritized objects to display in AR display 126. Content replacement program 122 may classify an object against database 132 of objects. Content replacement program 122 may further prioritize a replacement based on a list of objects that have registered with the augmented reality simulation. In another example, content replacement program 122 may utilize interest of the user to drive an AR driven prediction based on priority of importance to the user.

In an example, content replacement program 122 may gather information about advertiser friendly complimentary items and modify the game world or an augmented reality simulation to demonstrate the complimentary good and then the targeted good. The injection may be combined with a complementary product. In another example, content replacement program 122 may slowly modify the game world or an augmented reality simulation until the targeted advertisement is detected to be non-intrusive. The injection and replacement may be performed in incremental steps at an injection and replacement rate that can be modified by frequency. In another example, content replacement program 122 may perform injection and replacement by directly updating a user's social network, which allows nontargeted users, to receive a specific target in game advertisements based on what other users in their network may like.

In an example, content replacement program 122 may provide an engagement success score based on the previous interaction of the user with an object and the new interaction with an advertised object overlaid on the previous object. The score tells the user if the interaction rate and brand association/recognition have been increased. In another example, content replacement program 122 may capture an advertisement awareness score via machine learning of response of the user during the in-game substitution. The frequency of global disturbance of the user by the introduction of the advertisement can lead content replacement program 122 to modify the method it is presented so that an advertisement replacement is not obvious or is less distracting to the user.

In another example, content replacement program 122 may optimize the augmented reality information dynamically presented to a user in real time, further using the ability to integrate social collaboration priorities (e.g., Likes, Dislikes, Hobbies, Interests, Communities, etc.) queried from social media sites to prioritize the AR overlay or replacement thereof back to AR display 126.

AR display 126 is configured to superimpose display virtual content, such as images and/or video, over a view of a real-world scene. Accordingly, in some embodiments, AR display 126 may be a video screen that includes superimposed virtual content over physical objects. In some embodiment, AR display 126 may include a transparent display that is capable of displaying superimposed virtual content over a user's view of the real world, such as a heads-up display. Transceiver 128 can be configured to allow augmented reality device 102 to communicate with other devices via network 108 (e.g., via Wi-Fi, cellular communications, etc.). User profile 130 can store user profile data for a user of augmented reality device 102. In one arrangement, user profile 130 can specify the items of interest to the user that are injected (e.g., substituted) and/or identify elements that the user would prefer to be replaced.

Figure 2:
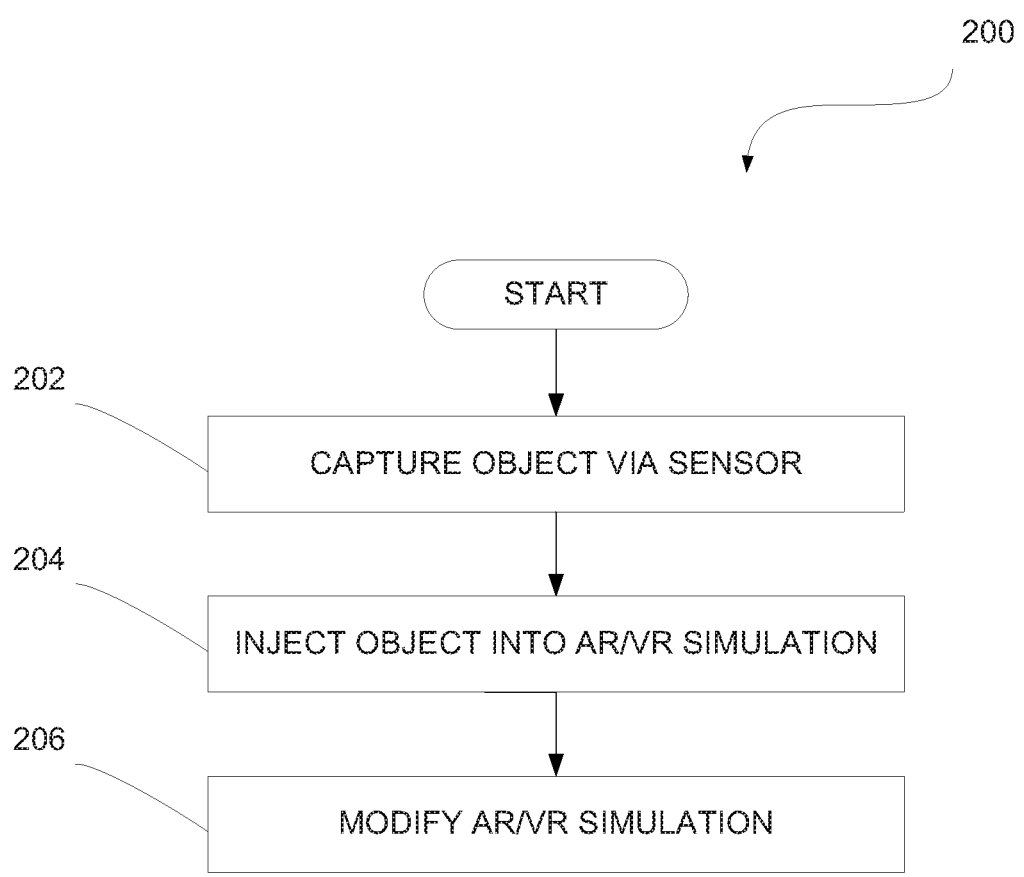
FIG. 2 is a flowchart depicting operational steps of a content replacement program within an augmented reality device of FIG. 1, in accordance with an embodiment of the present disclosure.

FIG. 2 is a flowchart 200 depicting operational steps of content replacement program 122 in accordance with an embodiment of the present disclosure.

Content replacement program 122 operates to capture objects 104, via sensor(s) 124, that have captured attention of a user. Content replacement program 122 also operates to inject objects 104 into an augmented reality simulation that reflect interest of the user and display objects 104 on AR display 126. Content replacement program 122 further operates to modify the augmented reality simulation to create a positive experience around the injected objects 104 in a non-intrusive way.

In step 202, content replacement program 122 captures objects 104, via sensor(s) 124, that have captured attention of the user. Content replacement program 122 captures a focal point of a user via eye tracking by sensor(s) 124 on objects 104 that have captured the attention of the user. In an example, a user can place augmented reality device 102 over the user's eyes and activate passive capture. Sensor(s) 124 capture the user's eye focus via eye tracking. Eye tracking is the measurement of eye activity. For example, eye tracking may measure the point of gaze (where one is looking) and the motion of an eye relative to the head. Accordingly, sensor(s) 124 can locate the focal point of the user. Sensor(s) 124 capture objects 104 and communicate data associated with objects 104 to content replacement program 122. Objects 104 on the focal point of the user can be identified by image recognition, product association with IoT connections, and/or via barcode capture. In an example, objects 104 may be physical objects that each include an object identification tag that is detectable by augmented reality device 102.

Content replacement program 122 may identify objects 104 by interpreting and processing data based on a focal point of a user that reflects the user's attention and interest on objects 104. In an example, determining an object of interest is based on the user's gaze focus, e.g., what a user focuses on. Determining an object of interest can be based on how much time a user looks at an object. For example, if a user glances at an object for over a certain period time, content replacement program 122 may recognize the interest of the user on the object. In another example, content replacement program 122 may recognize the interest of the user on an object based on multiple glances to the same object. In another example, content replacement program 122 may recognize the interest of the user on an object based on augmented reality device 102 detecting a speech of the user on the object. In another example, a user may opt-in to a specific replacement such as a grocery store to freely replace artifacts in augmented reality device 102. With this opt-in a user can highlight specific replacement objects and items.

In step 204, content replacement program 122 injects objects 104 into an augmented reality simulation that reflects the interest of the user. Content replacement program 122 may capture and associate a context in an augmented reality simulation to objects 104 that attracts the attention and interest of the user. When the user plays a video game in the augmented reality simulation, in-game context is captured and matched with user interaction context of focused item. Content replacement program 122 can determine via semantic ontology of items of interest or associated tags in the augmented reality simulation. In an example, a user can specify items of interest in user profile 130. In another example, content replacement program 122 can associate a context based on a generic tag association to objects 104. Content replacement program 122 may pull semantic tags from the generic tag association related to objects 104 and determine a list of prioritized objects to display in AR display 126. Content replacement program 122 may classify an object against database 132 of objects. Content replacement program 122 may further prioritize a replacement based on a list of objects that have registered with the augmented reality simulation.

In step 206, content replacement program 122 modifies the augmented reality simulation to create a positive experience around the injected object. Content replacement program 122 modifies the augmented reality simulation around the object in the virtualized view in a non-intrusive way. Content replacement program 122 may change the augmented reality simulation difficulty when objects 104 are injected. Content replacement program 122 may slowly modify the augmented reality simulation to allow for replacement and injection of the object. In an example, content replacement program 122 may gather information about advertiser friendly complimentary items and modify the game world or augmented reality simulation to demonstrate the complimentary good and then the targeted good. The injection may be combined with a complementary product. In another example, content replacement program 122 may slowly modify the game world or augmented reality simulation until the targeted advertisement is detected to be non-intrusive. The injection and replacement may be performed in incremental steps at an injection and replacement rate that can be modified. In another example, content replacement program 122 may perform injection and replacement by directly updating a user's social network, which allows nontargeted users, to receive specific targeted in game advertisements based on what other users in their network may like. Content replacement program 122 may recognize an engagement success score that is determined by the user's previous interaction with an object and the new interaction with the advertised object overlaid on the previous one. Content replacement program 122 may recognize advertisement engagement success based on the score and adjust an object replacement frequency accordingly. Content replacement program 122 may also recognize an awareness score that can be captured via machine learning of the user's responses during an in-game replacement. Content replacement program 122 may adjust an object replacement frequency for an object accordingly based on the awareness score.

Figure 3:
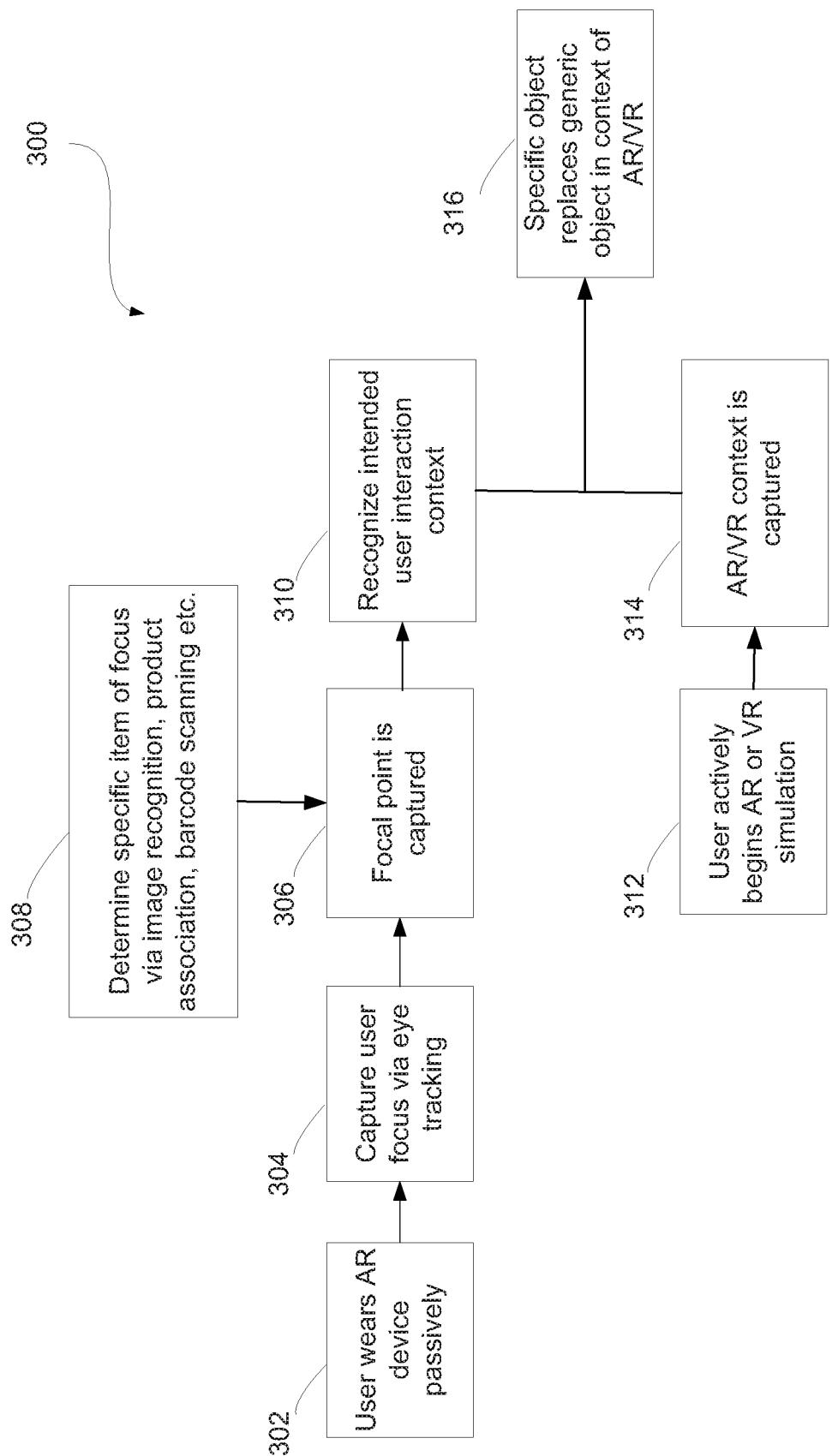
FIG. 3 is a flowchart depicting operational steps of the content replacement program included in the augmented reality device of FIG. 1, in accordance with an embodiment of the present disclosure.

FIG. 3 is a flow diagram 300 depicting operational steps of content replacement program 122 in accordance with an embodiment of the present disclosure.

Flow diagram 300 depicts example operational steps of content replacement program 122 when a user uses augmented reality device 102. A user may place augmented reality device 102 over the user's eyes and activate passive capture. The user can disable this feature or have to opt in to have their information be obtained. The user is in control of what type of information is going to be collected and aware of how that information is going to be used. In an embodiment, the user is notified when the data collection of the user's information is being collected. In another example, the user can easily select the use of the user's information in one aspect but can dis-allow the use of the user's information in another aspect. Content replacement program 122 operates to capture the user's eye focus via eye tracking by sensor(s) 124. When the focal point of the user is captured, content replacement program 122 may identify objects 104 by interpreting and processing data based on a focal point of the user that reflects the user's attention and interest. Content replacement program 122 operates to determine intended user interaction context. Content replacement program 122 also operates to capture AR/VR context. Content replacement program 122 further operates to replace a generic object with a specific object in context of AR/VR.

In an example use case, a user is planning on remodeling his house. When the user goes to a store to gather the initial painting materials, he is wearing augmented reality device 102. As the user passes by a paint section, augmented reality device 102 knows that he is planning on painting due to captured conversation context, search terms via IoT connection, and or other data sources. The user can disable this feature or have to opt in to have their information be obtained. The user is in control of what type of information is going to be collected and aware of how that information is going to be used. In an embodiment, the user is notified when the data collection of the user's information is being collected. In another example, the user can easily select the use of the user's information in one aspect but can dis-allow the use of the user's information in another aspect. When the user is glancing at different paint cans sitting on the aisle, he is considering two shades of blue, looking between the two colors. He also views some other materials walking through the store, including, for example, different trimming, lighting mounts, and other materials. Augmented reality device 102 captures his differing focal points. The user decides to wait on his purchase. When he returns home, he views the unfinished room, and augmented reality device 102 automatically knows to query the paint colors that were focused on the longest, along with the other materials. These configurations can be presented to the user without requiring his interaction with the system to save his viewed content. AR display 126 may create a virtual color palette to showcase the array of colors, textures, and possible options that the user is considering from earlier in the day at when he visited his local hardware store. This allows the user the opportunity to mix and match items through augmented reality device 102 without having physical samples in hand that he forgot to pick up at the store earlier in the day.

In another example use case, a user is playing an AR/VR game. Augmented reality device 102 has determined, for example, that the user was looking at a specific towel brand in the store. When the game has towels in the background, the specific towel brand replaces a generic towel that is in the game. The game also levels down one level from user's typical skill challenge level. Subconsciously, the user has been exposed to this specific towel brand and has also associated that with a positive and pleasant experience.

In another example use case, a user has decided to cook a meal at his home. As the user is cooking, augmented reality device 102 generates a tutorial based on the recipe. This recipe has generic information (e.g., to use chicken broth), however the user doesn't know what the packaging of the specific chicken broth he owns looks like. The user's focus and interaction with stocking his refrigerator and cabinets are queried, and an AR tutorial injects the specific packaging of the brand he bought into the tutorial, thus allowing him to know what exactly the packaging and product looks like for him to find it in his house.

In step 302, a user places augmented reality device 102 over the user's eyes and activates passive capture. In step 304, content replacement program 122 captures the user's eye focus via eye tracking by sensor(s) 124. Eye tracking is the measurement of eye activity. For example, eye tracking may measure the point of gaze (where one is looking) and the motion of an eye relative to the head. Accordingly, sensor(s) 124 can locate the focal point of the user. Sensor(s) 124 capture objects 104 and communicate data associated with objects 104 to content replacement program 122.

In step 306, content replacement program 122 captures the focal point of the user. Content replacement program 122 may identify objects 104 by interpreting and processing data based on the focal point of the user that reflects the user's attention and interest on objects 104. In an example, determining object of interest is based on the user's gaze focus—what the user focuses on. Determining object of interest can be based on how much time the user looks at an object. For example, if the user glances at an object for over a certain period time, content replacement program 122 may recognize the user's interest on the object. In another example, content replacement program 122 may recognize the user's interest on an object based on multiple glances to the same object.

In step 308, content replacement program 122 may recognize and determine specific items on the focal point of the user that have captured the user's attention by image recognition, product association with IoT connections, and/or via barcode capture. In step 310, content replacement program 122 recognizes intended user interaction context. User interaction context includes contextual information about how, why and where the user was interacting with the object. Content replacement program 122 may analyze and compare the user interaction context to captured AR/VR context to determine whether to replace a generic object in context of AR/VR with a specific object associated with the user interaction context. In an example, content replacement program 122 recognizes user interaction context based on the captured objects that have captured user's attention. In another example, content replacement program 122 recognizes user interaction context based on user's IoT connections such as context from calendar, meetings, captured audio and video, and other data sources that may be relevant to the captured objects information. Content replacement program 122 may generate associated keywords (e.g., metadata tags) for the user interaction context.

In step 312, the user actively begins an augmented reality (AR) or virtual reality (VR) simulation such as a video game. In step 314, content replacement program 122 captures AR/VR context by, for example, keywords, metatags, and similar items in the AR/VR context. In step 316, content replacement program 122 replaces a generic object with a specific object in context of AR/VR based on the user's interest. In an example, content replacement program 122 may gather information about advertiser friendly complimentary items and modify the game world or augmented reality simulation to demonstrate the complimentary good and then the targeted good. The injection may be combined with a complementary product. In another example, content replacement program 122 may slowly modify the game world or augmented reality simulation until the targeted advertisement is detected to be non-intrusive. The injection and replacement may be performed in incremental steps at an injection and replacement rate that can be modified by frequency. In another example, content replacement program 122 may perform injection and replacement by changing directly to a user's social network, which allows non-targeted users, to receive specific targeted in game advertisements based on what other users in their network may like.

Figure 4:
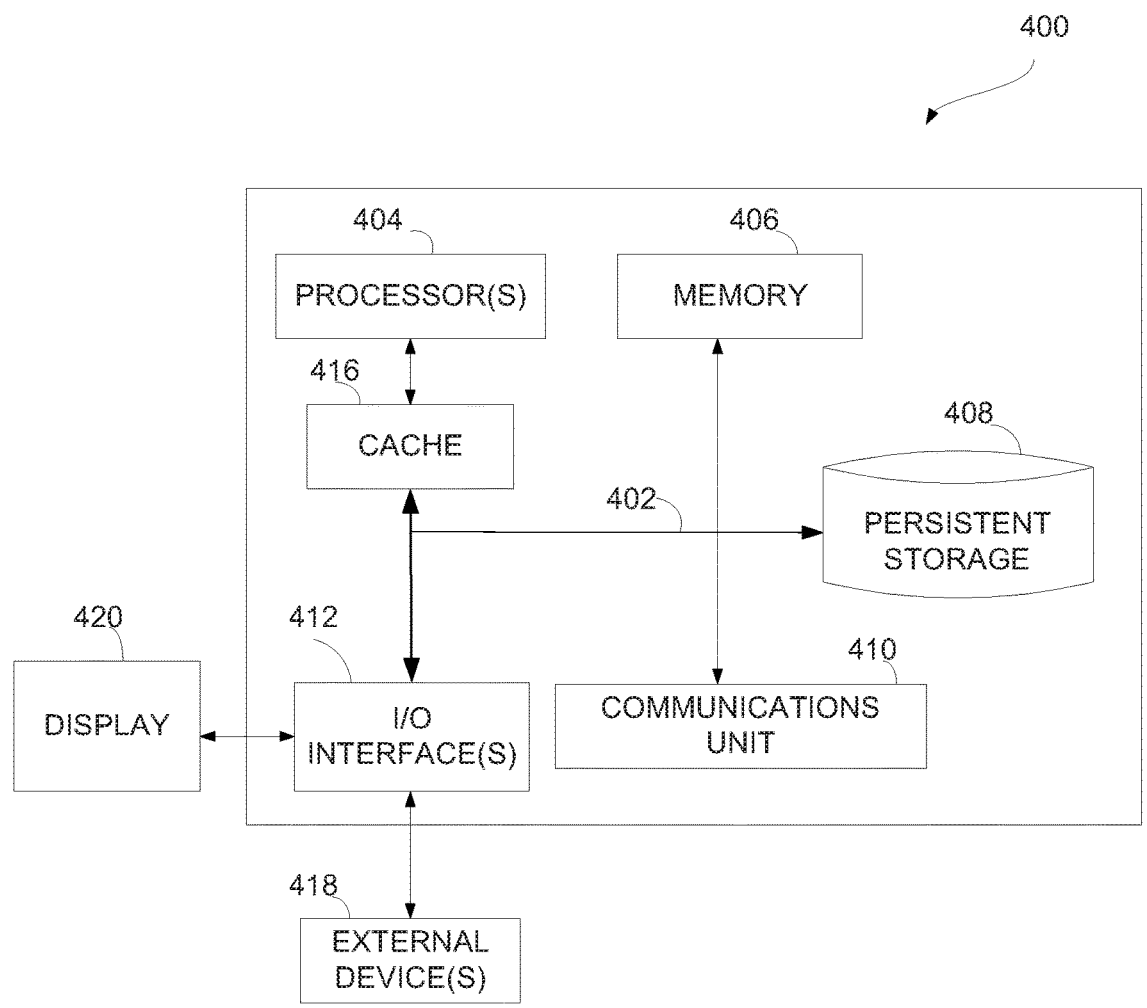
FIG. 4 is a block diagram of components of the augmented reality device of FIG. 1, in accordance with an embodiment of the present disclosure.

FIG. 4 depicts a block diagram 400 of components of augmented reality device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Augmented reality device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Content replacement program 122 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Content replacement program 122 may be downloaded to persistent storage 408 through communications unit 410.

I/O interface(s) 412 allows for input and output of data with other devices that may be connected to augmented reality device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., content replacement program 122 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
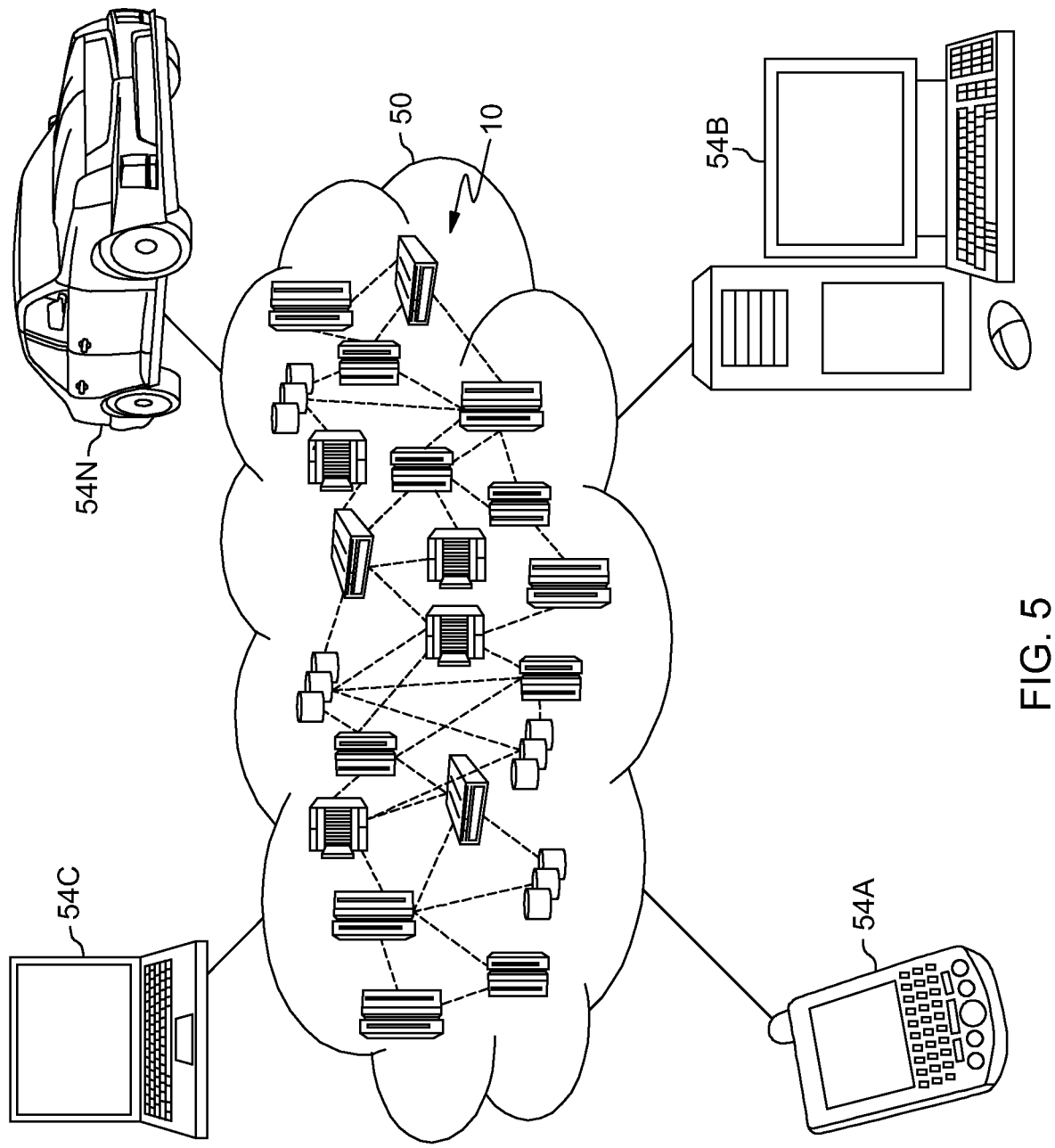
FIG. 5 depicts an embodiment of a cloud computing environment in accordance with the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
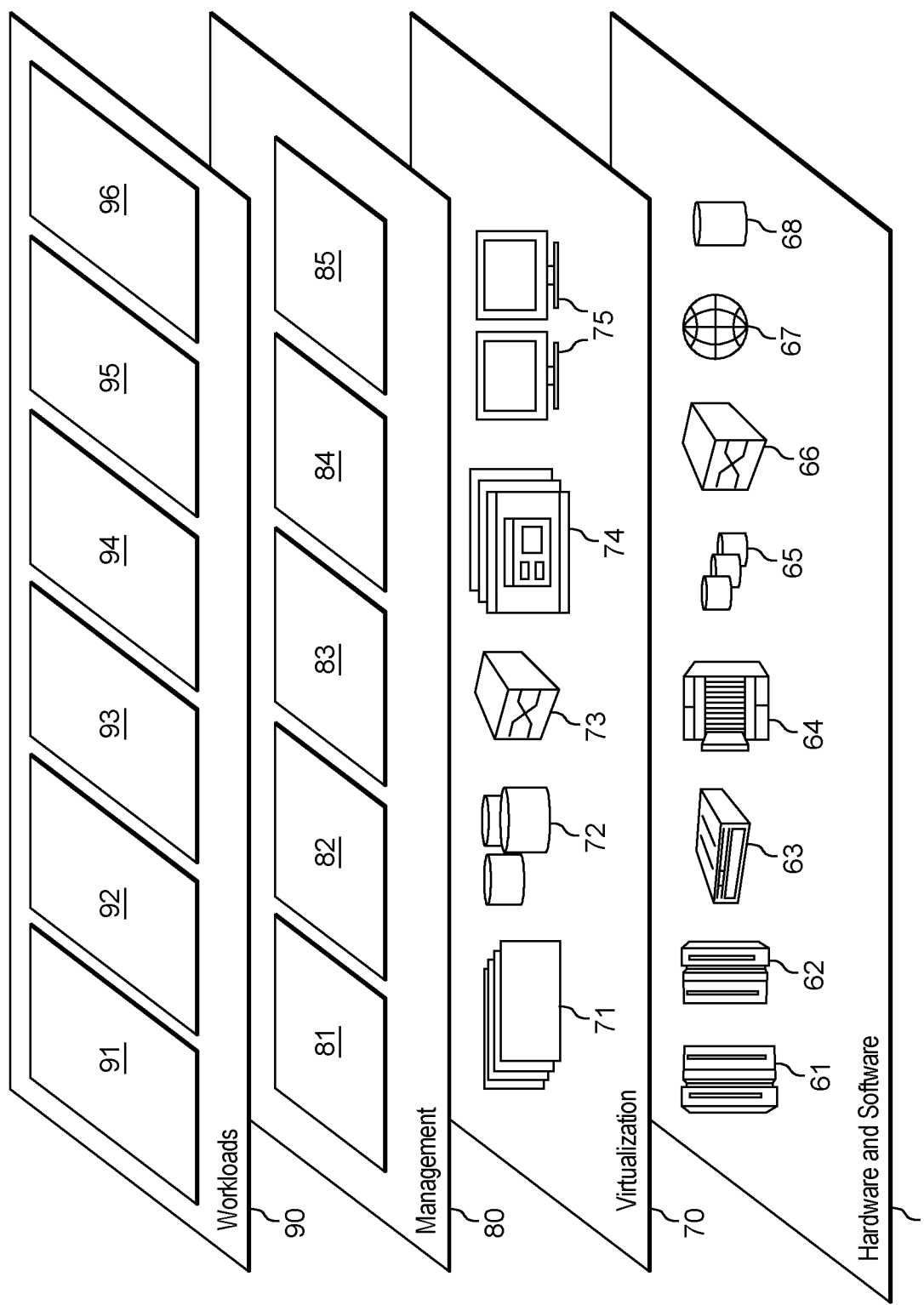
FIG. 6 depicts an embodiment of abstraction model layers of a cloud computing environment, in accordance with the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, content replacement program 122 as described above with respect to augmented reality environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   capturing, by one or more processors, an object, via a sensor, that has captured attention of a user;
   injecting, by one or more processors, the object in a virtualized view into an augmented reality simulation;
   modifying, by one or more processors, the augmented reality simulation around the object in the virtualized view in a non-intrusive way;
   replacing, by one or more processors, a pre-existing virtual object in the augmented reality simulation with the object that has captured the attention of the user; and
   prioritizing, by one or more processors, a replacement based on a list of objects that have registered with the augmented reality simulation, the list of objects being prioritized based on semantic tags from a generic tag association related to the list of objects.

2. The computer-implemented method of claim 1, wherein capturing the object includes capturing a focal point of the user via eye tracking.

3. The computer-implemented method of claim 1, further comprising:
   interpreting, by one or more processors, data from the sensor to determine the object generates interest to the user.

4. The computer-implemented method of claim 1, wherein the replacement is performed in incremental steps at a replacement rate that can be modified.

5. The computer-implemented method of claim 1, further comprising:
   responsive to injecting the object into the augmented reality simulation, changing, by one or more processors, a difficulty of the augmented reality simulation.

6. A computer program product comprising:
   one or more computer readable storage media and program instructions stored on the one or more computer readable storage media, the program instructions comprising:
   program instructions to capture an object, via a sensor, that has captured an attention of a user;
   program instructions to inject the object in a virtualized view into an augmented reality simulation;
   program instructions to modify the augmented reality simulation around the object in the virtualized view in a non-intrusive way;
   program instructions to replace a pre-existing virtual object in the augmented reality simulation with the object that has captured the attention of the user; and
   program instructions to prioritize a replacement based on a list of objects that have registered with the augmented reality simulation, the list of objects being prioritized based on semantic tags from a generic tag association related to the list of objects.

7. The computer program product of claim 6, wherein program instructions to capture the object includes program instructions to capture a focal point of the user via eye tracking.

8. The computer program product of claim 6, further comprising:
   program instructions, stored on the one or more computer-readable storage media, to interpret data from the sensor to determine the object generates interest to the user.

9. The computer program product of claim 6, wherein the replacement is performed in incremental steps at a replacement rate that can be modified.

10. The computer program product of claim 6, further comprising:
    program instructions, stored on the one or more computer-readable storage media, responsive to injecting the object into the augmented reality simulation, to change a difficulty of augmented reality simulation.

11. A computer system comprising:
    one or more computer processors, one or more computer readable storage media, and program instructions stored on the one or more computer readable storage media for execution by at least one of the one or more computer processors, the program instructions comprising:
    program instructions to capture an object, via a sensor, that has captured an attention of a user;
    program instructions to inject the object in a virtualized view into an augmented reality simulation;
    program instructions to modify the augmented reality simulation around the injected object in the virtualized view in a non-intrusive way;

program instructions to replace a pre-existing virtual object in the augmented reality simulation with the object that has captured the attention of the user; and program instructions to prioritize a replacement based on a list of objects that have registered with the augmented reality simulation, the list of objects being prioritized based on semantic tags from a generic tag association related to the list of objects.

12. The computer system of claim 11, wherein program instructions to capture the object includes program instructions to capture a focal point of the user via eye tracking.

13. The computer system of claim 11, further comprising:
program instructions, stored on the one or more computer-readable storage media, to interpret data from the sensor to determine the object generates interest to the user.

14. The computer system of claim 11, wherein the replacement is performed in incremental steps at a replacement rate that can be modified.

* * * * *